United States Patent
Kim et al.

(10) Patent No.: US 11,537,348 B2
(45) Date of Patent: Dec. 27, 2022

(54) MULTI-DISPLAY APPARATUS WITH SENSORS

(71) Applicant: SAMSUNG ELECTRONICS CO., LTD., Suwon-si (KR)

(72) Inventors: Sejun Kim, Suwon-si (KR); Yongsik Kwon, Suwon-si (KR); Kibo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/075,935

(22) Filed: Oct. 21, 2020

(65) Prior Publication Data

US 2021/0117145 A1   Apr. 22, 2021

(30) Foreign Application Priority Data

Oct. 22, 2019  (KR) ..................... 10-2019-0131116

(51) Int. Cl.
  *G06F 3/14*   (2006.01)
  *G09G 5/12*   (2006.01)
(52) U.S. Cl.
  CPC ............. *G06F 3/1446* (2013.01); *G09G 5/12* (2013.01); *G09G 2300/026* (2013.01)
(58) Field of Classification Search
  CPC ... G06F 3/1446; G09G 5/12; G09G 2300/026
  See application file for complete search history.

(56) References Cited

U.S. PATENT DOCUMENTS

| 6,040,821 A | * | 3/2000 | Franz | ..................... | G05G 9/047 345/157 |
| 2003/0146882 A1 | * | 8/2003 | Ogino | .................. | G09G 3/2092 345/1.1 |
| 2012/0050135 A1 | * | 3/2012 | Glen | ..................... | G06F 3/1446 345/1.1 |

(Continued)

FOREIGN PATENT DOCUMENTS

| EP | 3009920 A1 | 4/2016 |
| JP | 5089441 B2 | 12/2012 |

(Continued)

OTHER PUBLICATIONS

Communication dated Mar. 4, 2021 issued by the European Patent Office in application No. 20202203.4.

*Primary Examiner* — Michael A Faragalla
*Assistant Examiner* — Sujit Shah
(74) *Attorney, Agent, or Firm* — Sughrue Mion, PLLC (57) ABSTRACT

Disclosed is a multi-display apparatus including display modules and a sensor. Some of the display modules sequentially connected receive a signal from the sensor, and each of the display modules transmits signals including the signal from the sensor to a display module connected to a rear stage thereof. The display module connected to a final stage transmits the signal from the sensor to a control box. The control box includes a detector configured to detect whether signals from a plurality of transmission lines include a generated flag signal based on the signals including a signal from the sensor and a selector configured to select a transmission line detected as including the flag signal by the detector and set the selected transmission line as a channel for communication with the sensor.

8 Claims, 4 Drawing Sheets

(56) References Cited

U.S. PATENT DOCUMENTS

| | | | |
|---|---|---|---|
| 2015/0205565 A1* | 7/2015 | Koguchi | G09G 3/2088 345/1.3 |
| 2016/0019831 A1* | 1/2016 | Hall | G09G 3/3413 345/212 |
| 2016/0019834 A1* | 1/2016 | Hall | G09G 3/3233 345/212 |
| 2016/0284386 A1 | 9/2016 | McCall et al. | |

FOREIGN PATENT DOCUMENTS

| | | |
|---|---|---|
| KR | 10-2002-0059381 A | 7/2002 |
| KR | 10-2017-0081416 A | 7/2017 |

\* cited by examiner

MULTI-DISPLAY APPARATUS WITH SENSORS

CROSS-REFERENCE TO RELATED APPLICATION

This application is based on and claims priority under 35 U. S. C. § 119 to Korean Patent Application No. 10-2019-0131116, filed on Oct. 22, 2019, the disclosure of which is herein incorporated by reference in its entirety.

BACKGROUND

1. Field

The disclosure relates to a multi-display apparatus, and more particularly, to a multi-display apparatus with a large display that is constituted by several small display modules such as a large format display (LFD) or a digital signage.

2. Discussion of Related Art

A multi-display apparatus such as a large format display (LFD) or a digital signage installed outdoors constitutes a large display by continuously arranging several small display modules. The multi-display apparatus is mainly used to display advertisements or news.

The multi-display apparatus includes a control box for controlling a plurality of display modules. The control box functions to control an image source of a screen to be displayed by the multi-display apparatus to be received from an external computer and display the received image source on each display module of the multi-display apparatus.

The multi-display apparatus usually includes several types of sensors. The sensors are used to detect conditions of the surrounding environment for the control of the multi-display apparatus. Examples of the sensors provided in the multi-display apparatus include an illuminance sensor, a temperature/humidity sensor, a motion sensor, or the like. For example, the illuminance sensor is used to automatically adjust brightness of the display screen of the multi-display apparatus according to the surrounding environment by detecting brightness around the multi-display apparatus.

In order for the signals detected by these sensors to be used for the control of the multi-display apparatus, the sensed signals need to be transmitted to the control box. The control box controls illuminance of the display screen of the multi-display apparatus to increase, for example, when it is detected that the surrounding brightness is very bright using the received detection signal.

The sensors are installed for the purpose of sensing the environment around the multi-display apparatus, and thus are installed around the multi-display apparatus. Typically, the sensors may be installed on individual display modules, may be installed on all the display modules, or may be installed on only some of the display modules, if necessary. For example, in the case of a relatively small multi-display apparatus, the illuminance sensor may be installed on only any one of the display modules, and in the case of a very large multi-display apparatus, one illuminance sensor may be installed at four corners, respectively. In order to transmit the signals detected by the sensors to the control box, a signal transmission path between the sensors and the control box needs to be constructed.

As one method for constructing the signal transmission path, a method of constructing a separate communication channel between the sensors and the control box may be considered. The communication channel is implemented by, for example, an optical cable connecting between the sensors and the control box. However, the method has a problem in that since a separate communication line needs to be added, it is necessary to construct an additional transmission line, and an appearance of an installation state of the multi-display is reduced.

As another method of constructing a signal transmission path, a method of forming a sensor data transmission line between the sensors and the control box in the display modules that are continuously arranged may be considered. The signal detected by the sensor is transmitted to the display module to which the optical cable is connected, and the display module re-formats sensor data and transmits the re-formatted sensor data to the control box. However, as the size of the multi-display apparatus increases, when a long line is used from a display module with a sensor to a display module to which an optical cable is connected, the reliability of communication decreases due to deterioration in signal quality. Therefore, there is a need for transmission without the deterioration in the signal quality due to re-timing or the like.

Meanwhile, in the existing sensor data transmission method, it is necessary to set a connection state of sensors to a central control device in the control box. However, when the number of display modules constituting a large display increases, such a setting operation becomes complicated. In addition, when the larger multi-display apparatus is configured by rearranging the display modules or increasing the number of display modules or when the sensors installed on the display modules are rearranged, an operation of separating and reconnecting the communication lines and resetting the control box accordingly needs to be performed.

SUMMARY

The disclosure provides a method of making a separate communication channel for transmitting signals detected by sensors in a multi-display apparatus to a control box unnecessary, preventing deterioration in a transmitted sensor signal from occurring, and making an operation of separating and reconnecting communication lines and resetting a control box unnecessary even when individual display modules are rearranged.

Provided is a multi-display apparatus including a plurality of display modules, each including a circuitry and one or more sensors. The plurality of display modules may include a first display module, a second display module installed at a front stage of the first display module, and a third display module installed at a rear stage of the first display module. Each of the display modules may include a first receiver, a second receiver, a transmitter, and a processor. The first receiver of the first display module may be configured to receive a signal from a sensor of the one or more sensors based on the sensor being connected and transmit the received signal to the processor of the first display module, the second receiver of the first display module may be configured to receive a signal from the transmitter in the second display module installed at the front stage and transmit the received signal to the processor of the first display module, the processor of the first display module may be configured to transmit signals from the first receiver and the second receiver of the first display module to the transmitter of the first display module, the transmitter of the first display module may be configured to transmit the signal to the second receiver in the display module installed at the rear stage, and the processor of the first display module may be configured to generate a flag signal based on the signal being input from the first receiver and transmit the generated flag signal to the transmitter of the first display module.

The multi-display apparatus may include a control box configured to control the plurality of display modules. The plurality of display modules may be constituted by a plurality of module sets each including the display modules sequentially connected, and the control box may be configured to receive signals through a plurality of transmission lines connected to display modules of a final stage in each of the module sets.

The control box may include a detector configured to detect whether the signals from the plurality of transmission lines include the flag signal, and a selector configured to select a transmission line detected as including the flag signal by the detector and set the selected transmission line as a channel for communication with the sensor.

According to an aspect of an embodiment, provided is a display module including a circuitry used to configure a multi-display apparatus, including a first receiver, a second receiver, a transmitter, and a processor, the first receiver may be configured to receive a signal from a sensor based on the sensor being connected and transmit the received signal to the processor, the second receiver may be configured to transmit the received signal to the processor, the processor may be configured to transmit the signals from the first receiver and the second receiver to the transmitter, the transmitter may be configured to output the signals transmitted from the processor, and the processor may be configured to generate a flag signal based on the signal being input from the first receiver and transmit the generated flag signal to the transmitter.

According to an aspect of an embodiment, provided is a control box for a multi-display apparatus receiving signals from a plurality of display modules, each including a circuitry, respectively, through a plurality of transmission lines, including: a detector configured to detect whether the signals from the plurality of transmission lines include a generated flag signal based on the signals including a signal from a sensor; and a selector configured to select a transmission line detected as including a flag signal by the detector and set the selected transmission line as a channel for communication with the sensor.

According to another aspect of the disclosure, disclosed is a method of transmitting a sensor signal of a multi-display apparatus including a plurality of display modules sequentially connected, each including a circuitry and one or more sensors. The method may include receiving, by a first display module of the plurality of display modules, a signal from one of the one or more sensors, generating, by the display module, a flag signal based on the signal being received from the sensor, transmitting, by the display module, the signal from the sensor, the flag signal, and a signal received from a second display module connected to a front stage of the first display module to a third display module connected to a rear stage of the first display module, and receiving, by a control box, signals from a display module connected to a final stage.

Each of the plurality of display modules may include a first receiver, a second receiver, a transmitter, and a processor. The method may include receiving, by the first receiver of the first display module, the signal from the sensor and transmitting, by the first receiver of the first display module, the received signal to the processor of the first display module, receiving, by the second receiver of the first display module, a signal from the transmitter in the second display module installed at the front stage and transmitting, by the second receiver of the first display module, the received signal to the processor of the first display module, generating by, the processor of the first display module, the flag signal and transmitting, by the processor of the first display module, the flag signal and the signal from the first receiver of the first display module and the signal from the second receiver of the first display module to the transmitter of the first display module, and transmitting, by the transmitter of the first display module, the signal to the second receiver in the second display module installed at the rear stage.

The plurality of display modules may be constituted by a plurality of module sets including the plurality of display modules sequentially connected, and the control box may be configured to receive signals through a plurality of transmission lines connected to display modules of the final stage in each of the module sets.

The control box may be configured to detect whether the signals from the plurality of transmission lines include the flag signal, and a transmission line detected as including the flag signal may be selected and may be set as a channel for communication with the sensor.

BRIEF DESCRIPTION OF THE DRAWINGS

The above and other aspects, features, and advantages of certain embodiments of the disclosure will be more apparent from the following description taken in conjunction with the accompanying drawings.

DETAILED DESCRIPTION

Hereinafter, the disclosure will be described in detail with reference to the accompanying drawings.

However, the technical idea and the core configuration and operation of the disclosure are not limited only to the configuration or operation described in the following examples. In describing the disclosure, if it is determined that a detailed description of the known technology or configuration related to the disclosure may unnecessarily obscure the subject matter of the disclosure, the detailed description thereof will be omitted.

In the disclosure, an expression "have", "may have", "include", "may include", or the like, indicates existence of a corresponding feature (for example, a numerical value, a function, an operation, a component such as a part, or the like), and does not exclude existence of an additional feature.

In the disclosure, an expression "A or B", "at least one of A and/or B", "one or more of A and/or B", or the like, may include all possible combinations of items enumerated together. For example, "A or B", "at least one of A and B", or "at least one of A or B" may indicate all of 1) a case in which at least one A is included, 2) a case in which at least one B is included, or 3) a case in which both of at least one A and at least one B are included.

In the description of the disclosure, the shape, shape, structure, location, and the like do not limit the protection scope of the disclosure unless it is essential to the implementation of the disclosure.

An expression "configured (or set) to" used in the disclosure may be replaced by an expression "suitable for", "having the capacity to" "designed to", "adapted to", "made to", or "capable of" depending on a situation. A term "configured (or set) to" may not necessarily mean "specifically designed to" in hardware. Instead, in some cases, an expression "a device configured to" may mean that the device may "do" together with other devices or components. For example, a "sub-processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory.

Figure 1:
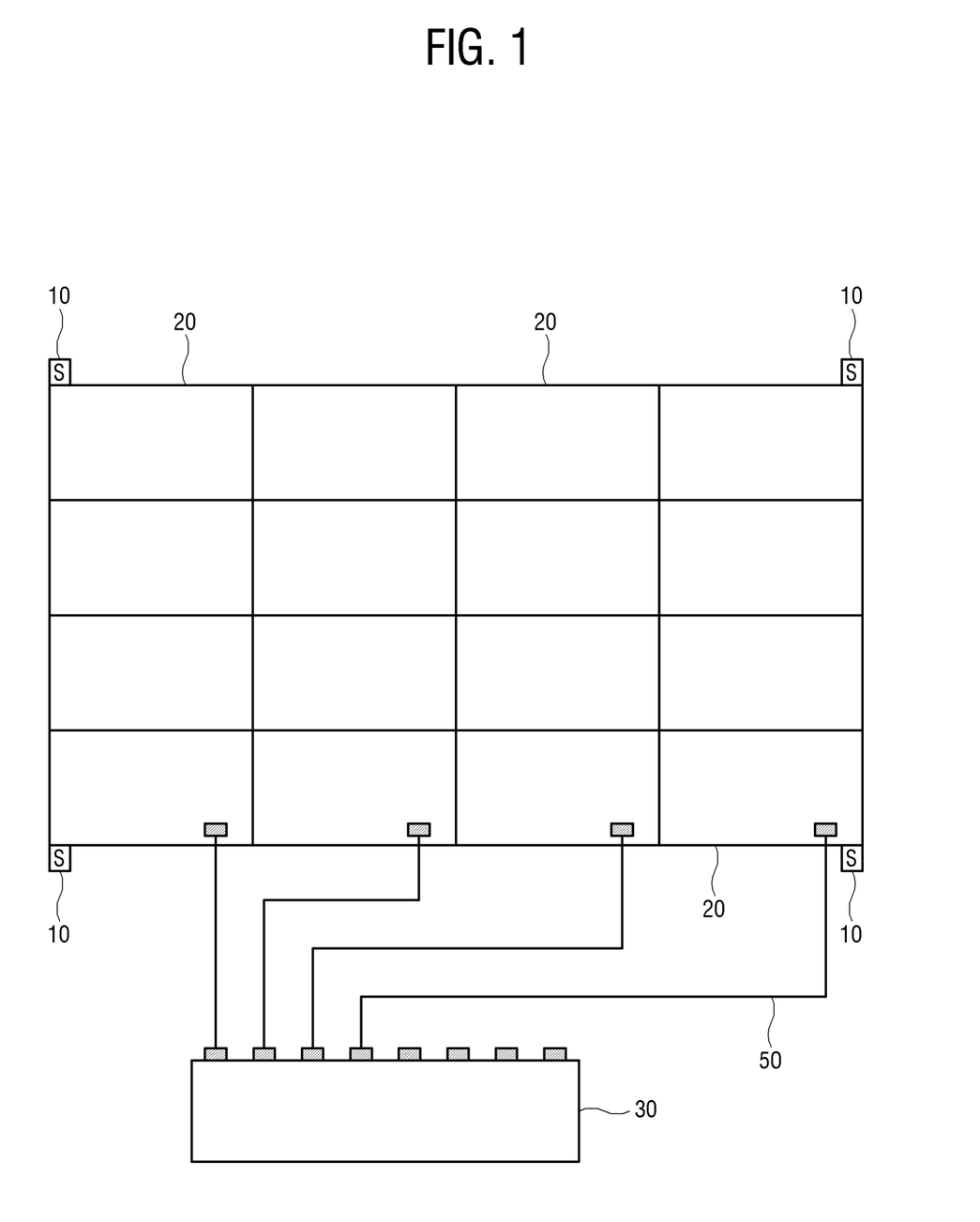
FIG. 1 is a schematic diagram of a multi-display apparatus according to the disclosure.

FIG. 1 is a schematic diagram of a multi-display apparatus according to the disclosure.

The multi-display apparatus is configured to include a plurality of display modules 20, a plurality of sensors 10, and a control box 30.

The display modules 20 are arranged on the same plane to constitute a large display (e.g., including display circuitry). The display module 20 may be, for example, an LED, an LCD, or the like. FIG. 1 illustrates a state in which 16 display modules 20 are arranged. The sensor 10 may be installed on some or all of the display modules 20, and is generally installed in some of the display modules 20. Accordingly, the sensor 10 may be directly connected to some of the display modules 20, and the sensor 10 may not be connected to some of the display modules 20. The sensor 10 may be, for example, an illuminance sensor, a motion sensor, a temperature/humidity sensor, or the like. The display module 20 to which the sensor 10 is connected is selected as needed. For example, the illuminance sensor may be configured to be installed at an upper left and a lower right of the entire display.

The control box 30 is connected to some of the display modules 20 through a transmission line 50. The control box 30 functions to control an image source of a screen to be displayed by the multi-display apparatus to be received from an external computer and display the received image source on each display module 20 of the multi-display apparatus. In addition, the control box 30 in the disclosure functions to receive a detection signal generated by the sensor 10. The transmission line 50 provides a transmission path through which an image to be displayed by the display module 20 and a control signal for controlling an image display operation are transmitted from the control box 30 to the display module 20, and a detection signal from the sensor 10 is also transmitted from the module 20 to the control box 30. The transmission line 50 may be, for example, an optical cable.

Figure 2:
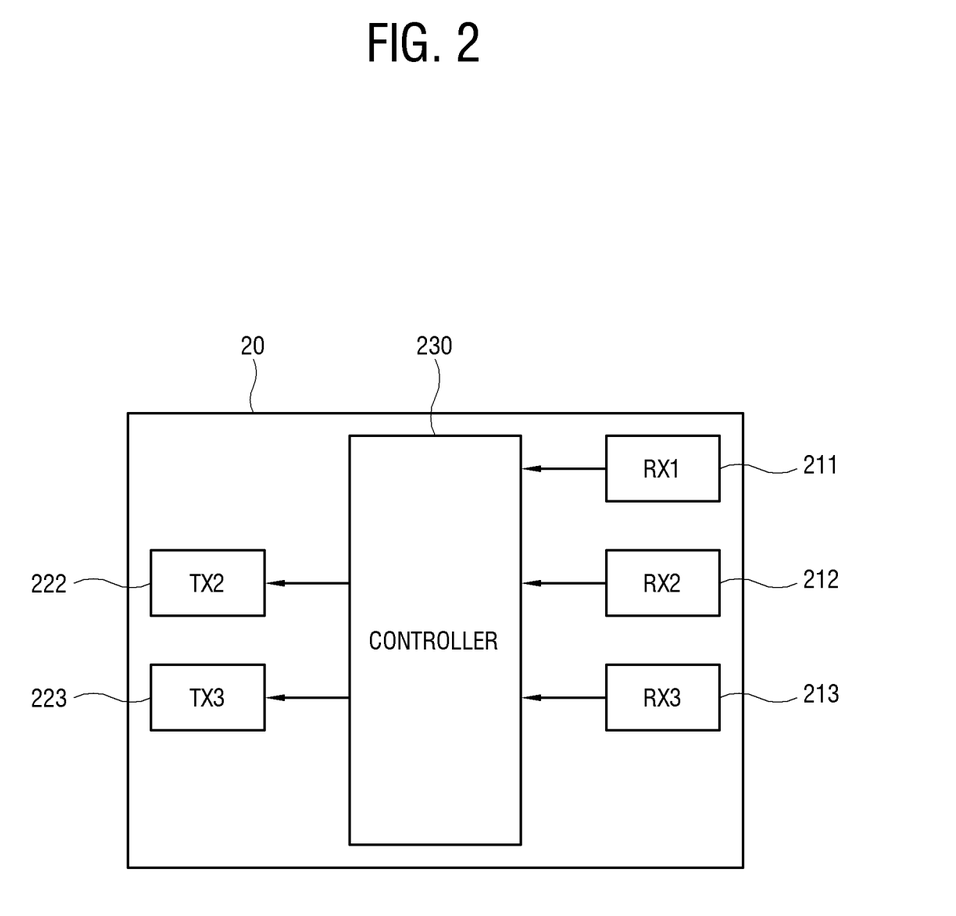
FIG. 2 is a block diagram of a display module included in the multi-display apparatus of FIG. 1.

FIG. 2 is a block diagram of a display module included in the multi-display apparatus of FIG. 1.

Each display module 20 includes three receivers 211, 212 and 213, two transmitters 222 and 223, and a controller 230.

RX1 211, which is one of the receivers 211, 212, and 213, is a first receiver and is directly connected to the sensor 10 to receive a signal from the sensor 10. Each of RX2 212 and RX3 213, which are the other two of the receivers, is a second receiver, and RX2 212 and RX3 213 are connected to transmitters 222 and 223 in a display module 20 installed in a front stage to receive signals from the transmitters 222 and 223 of the display module 20 in the front stage.

The transmitters 222 and 223 are connected to second receivers 212 and 213 of a display module 20 installed at a rear stage to transmit signals to the second receivers 212 and 213 of the display module 20 in the rear stage. The transmitters 222 and 223 are constituted by two blocks, that is, TX2 222 and TX3 223.

The present embodiment illustrates the case where two second receivers 212 and 213 and two transmitters 222 and 223 are provided, but one second receiver and one transmitter may be provided.

The controller 230 transmits signals from the first receiver 211 and the second receivers 212 and 213 to the transmitters 222 and 223. At this time, the controller 230 transmits the signal from the RX2 212 of the second receivers 212 and 213 to the TX2 222 of the transmitters 222 and 223, and transmits the signal from the RX3 213 to the TX3 223 of the transmitters 222 and 223. In addition, the controller 230 transmits the signal from the first receiver 211 to both the transmitters 222 and 223. For the operation of the controller 230, the controller 230 includes a storage that temporarily stores the signals from the receivers 211, 212, and 213 and then transmits the stored signals to the transmitters 222 and 223. Typically, the storage is constituted by a register.

In addition, the controller 230 includes a sensor detection unit (not illustrated). The sensor detection unit detects when the sensor 10 is connected to the display module 20. That is, when the sensor 10 is connected to the first receiver 211 of the display module 20, the detection signal from the sensor 10 is received by the first receiver 211, and the signal received by the first receiver 211 is transmitted to the controller 230. The sensor detection unit may be implemented by providing an extraction logic, which extracts the signal from the sensor 10, in the controller 230. For example, when a certain signal is input from the first receiver 211, the extraction logic determines that the sensor 10 is connected, and considers that the input signal is a signal transmitted by the sensor 10.

The controller 230 generates a flag signal when the sensor detection unit detects the signal from the sensor 10. That is, when the sensor 10 is not connected to the display module 20, the flag signal has "0" as a default value, and when the sensor 10 is connected to the display module 20, the controller 230 generates "1" as a flag signal. The controller 230 transmits the generated flag signal to the transmitters 222 and 223.

Figure 3:
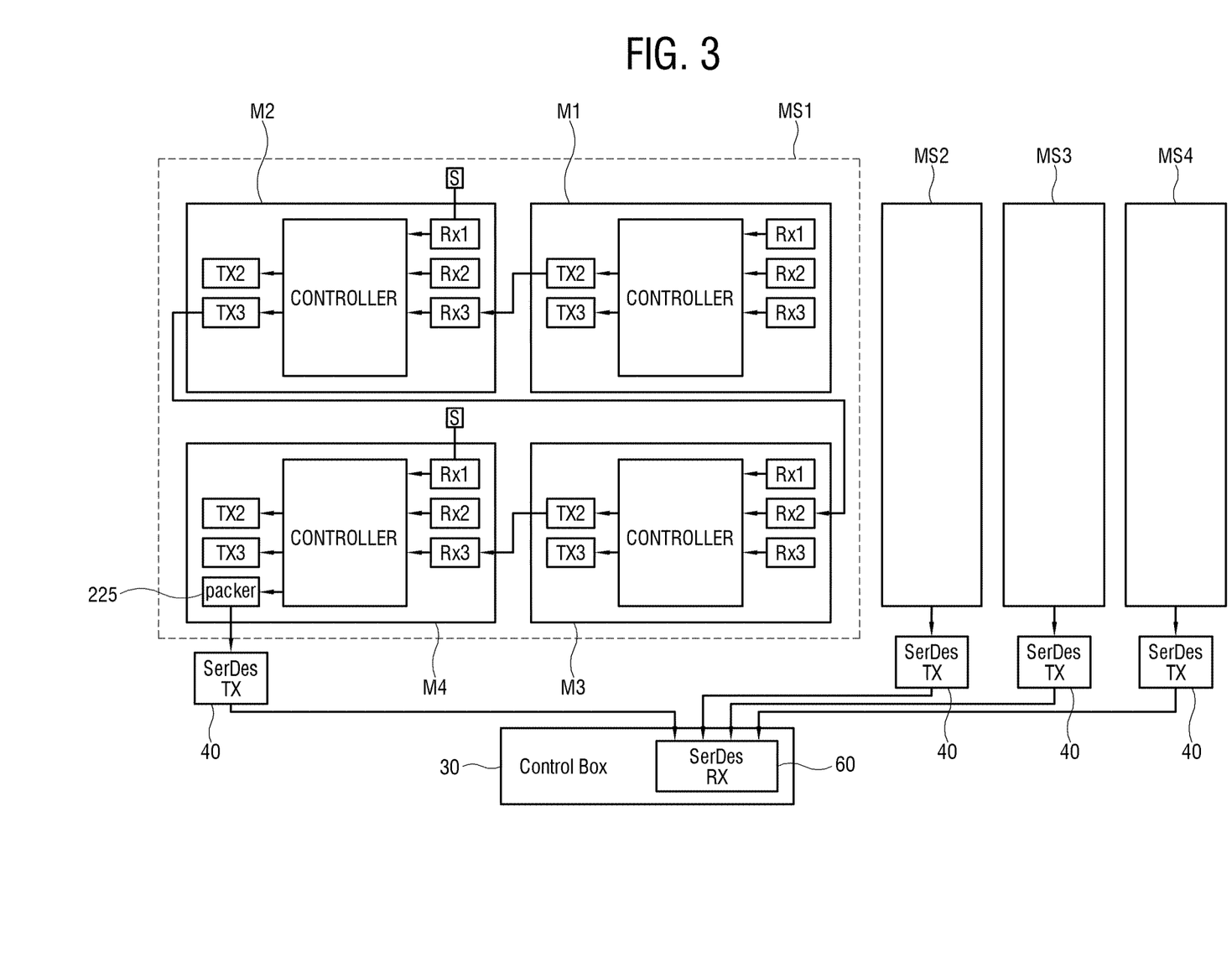
FIG. 3 is a diagram illustrating a detailed configuration of the multi-display apparatus of FIG. 1.

FIG. 3 is a diagram illustrating a detailed configuration of the multi-display apparatus of FIG. 1.

In FIG. 3, for convenience of illustration and description, each display module 20 is marked as M1 to M4, and each module set constituted by four display modules 20 is marked as MS1 to MS4. The receivers 211, 212, and 213 in one display module 20 are each marked as RX1 to RX3, the transmitters 222 and 223 are marked as TX2 and TX3, and the sensor 10 is marked as S, and reference numbers thereof are omitted.

In FIG. 3, the multi-display apparatus includes 16 display modules 20, and four display modules 20 form one module set, and are constituted by four module sets MS1 to MS4. In the display modules 20 in the first module set MS1, M1 to M4 are sequentially connected. In each of the module sets MS1 to MS4, the display modules 20 are connected in the same manner, but the order or method of the connection may be different. That is, the four display modules M1 to M4 provided in the first module set MS1 are sequentially connected in a zigzag manner, and generally, such a connection method or order is configured identically in each module set MS1 to MS4, but may be configured differently.

In the first module set MS1, each display module 20 is connected to transmit signals in the order of M1 to M4. At this time, the TX2 of the M1 is connected to the RX3 of the M2, the TX3 of the M2 is connected to the RX2 of the M3, and the TX2 of the M3 is connected to the RX3 of the M4. This connection method is based on the connection method of the display modules 20 of the existing multi-display apparatus. Therefore, an output signal from the TX2 of the M1 is received by the RX3 of the M2 and output from the TX3 of the M2, an output signal from the TX3 of the M2 is received by the RX2 of the M3 and output from the TX2 of the M3, and an output signal from the TX2 of the M3 is received by the RX3 of the M4 and output from the TX3 of the M4.

The controller 230 transmits signals including signals from all the receivers RX1 to RX3 to each transmitter TX2 and TX3. Therefore, in the connection state described above, the signals are transmitted in the order of the TX2 of the M1, the RX3 of the M2, the TX3 of the M2, the RX2 of the M3, the TX2 of the M3, the RX3 of the M4, and the TX3 of the M4.

Each module set MS1 to MS4 is provided with the sensor 10, and in each module set MS1 to MS4, the number of sensors 10, the type of sensors 10, or the display module 20 to which the sensors 10 are connected may be identical or different. In addition, the sensor 10 may not be provided in any module set. For example, in a state in which the display module 20 is arranged in the example of FIG. 1, if one column is configured to form one module set, the display modules 20 in the first to fourth columns configure each module set MS1 to MS4. At this time, as illustrated in FIG. 1, if one sensor is arranged at each of the four corners, the first module set MS1 and the fourth module set MS4 are module sets that include the sensor 10 and the second module set MS2 and the third module set MS3 are module sets that do not include the sensor 10. The disclosure will be described below under the assumption of the situation.

Among the module sets provided with one sensor 10, for example, the display modules M1 to M4 provided in the MS1, the display module to which the sensor 10 is directly connected and the display modules to which the sensor 10 is not connected may be provided. In the example of FIG. 3, the M2 and the M4 are display modules to which the sensor 10 is connected, and the M1 and the M3 are display modules to which the sensor 10 is not connected.

The control box 30 receives a signal from a display module connected to a final stage, among the display modules 20. Specifically, the control box 30 is connected to the display module M4 of the final stage on the connection path in the first module set MS1. Likewise, the control box 30 is also connected to the display module M4 of the final stage on the connection path in the second to fourth module sets MS2 to MS4. A SerDes TX 40 as a transmission interface is provided in the display module M4 of the final stage of each module set MS1 to MS4, and a SerDes RX 60 as a receiving interface receiving a signal from the SerDes TX 40 is provided in the control box 30. When the signal from the display module M4 of the final stage is converted into serial data by the SerDes TX 40 and transmitted through the transmission line 50, the SerDes RX 60 converts the signal into parallel data and transmits the signal to the control box 30. In this way, the control box 30 receives signals from the four module sets MS1 to MS4 through the four transmission lines 50.

Meanwhile, a packer 225 is provided in the display modules M1 to M4. The packer 225 is provided in all the display modules M1 to M4, but the packer 225 is used only in the display module M4 of the final stage, and the packer 225 is not used in the display modules M1 to M3 of the front stage. In consideration of this point, for convenience of illustration, the packer 225 is illustrated only in the display module M4 of the final stage. The packer 225 functions to pack an image signal, a control signal, a sensor signal, and the like. Since other signals other than the sensor signal among the signals input to the packer 225 are irrelevant to the disclosure, a path through which such other signals are input is omitted in FIG. 3.

The controller 230 in each display module M1 to M4 transmits the signals from all the receivers RX1 to RX3 to all the transmitters TX2 and TX3 and at the same time transmits the transmitted signals to its own packer 225. The SerDes TX 40 is connected to the packer 225 of the display module M4 of the final stage. Therefore, the detection signal from the sensor is transmitted to the SerDes TX 40 together with other signals.

Hereinafter, an operation of the multi-display apparatus according to the disclosure having the above configuration will be described.

In the first module set MS1 of FIG. 3, signals including signals from the RX1 to RX3 of the M1 are each transmitted to the TX2 and the TX3 of the M1 by the controller 230 of the M1.

Since the TX2 of the M1 is connected to the RX3 of the M2, the signal from the M1 is transmitted to the RX3 of the M2, and the signal is transmitted to the TX2 and the TX3 of the M2 by the controller 230 of the M2. At this time, since the sensor 10 is connected to the RX1 of the M2, the controller 230 of the M2 generates a flag signal as "1", and both the flag signal and the signal from the sensor 10 are also transmitted to the TX2 and the TX3 of the M2.

Since the TX3 of the M2 is connected to the RX2 of the M3, the signal from the M2 is transmitted to the RX2 of the M3, and the signal is transmitted to the TX2 and the TX3 of the M3 by the controller 230 of the M3. At this time, since the sensor 10 is connected to the RX1 of the M3, the controller 230 of the M3 generates the flag signal as "1", and both the flag signal and the signal from the sensor 10 are also transmitted to the TX2 and the TX3 of the M3.

Since the TX2 of the M3 is connected to the RX3 of the M4, the signal from the M3 is transmitted to the RX3 of the M4, and the signal is transmitted to the TX2 and the TX3 of the M4 by the controller 230 of the M4. The controller 230 of the M4 transmits the same signal to the packer 225, and the SerDes TX 40 receives the signal from the packer 225 and transmits the received signal to the SesDes RX 60 through the transmission line 50.

Through this process, the signals are sequentially transmitted from the M1 to the M4 and then transmitted to the control box 30, and the signal includes the signals from the sensors 40 and the flag signal. This process is performed by all the module sets MS1 to MS4. At this time, since the sensor 10 is not installed in some of the module sets MS2 and MS3, the signals transmitted from the module sets MS2 and MS3 do not include the signal from the sensor 10, and the flag signal becomes "0".

Figure 4:
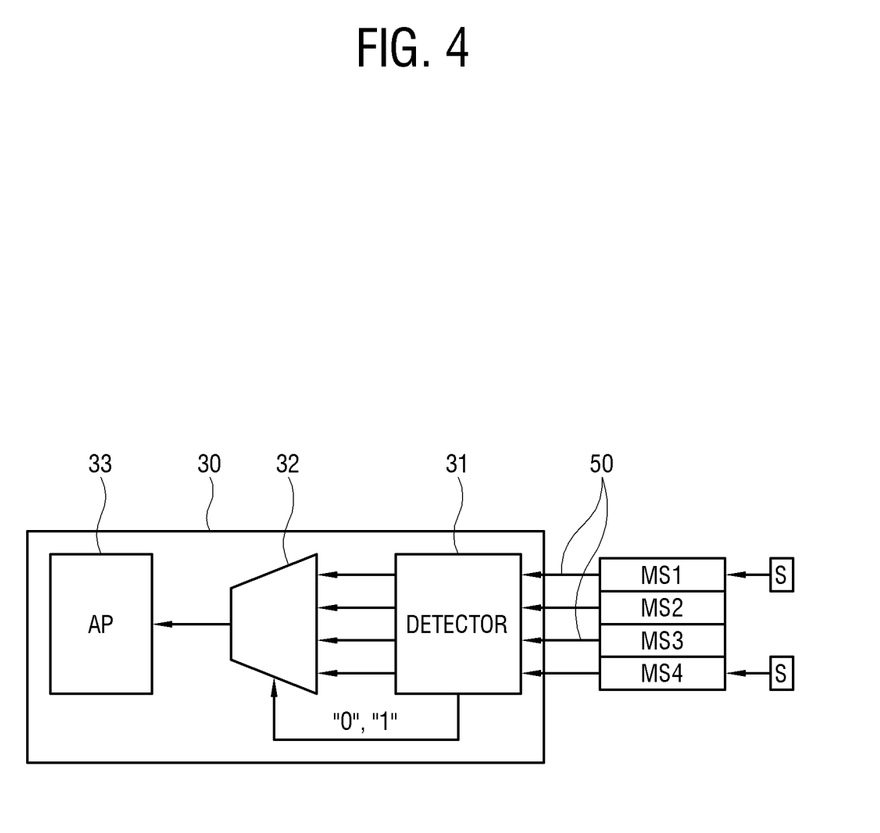
FIG. 4 is a block diagram of a control box of FIG. 1.

FIG. 4 is a block diagram of the control box of FIG. 1, and is a diagram illustrating the module sets MS1 to MS4 of FIG. 3 together. In FIG. 4, the SerDes TX 40, the transmission line 50, and the SerDes RX 60 are omitted.

The control box 30 includes a detector 31, a selector 32, and a processor 33. The detector detects whether the flag signal is included in the signals from each module set MS1 to MS4 transmitted through each transmission line 50, and specifically, detects whether the flag signal is "1". The selector 32 selects the transmission line 50 on which the flag signal is detected by the detector 31. The selector 32 may be implemented as a multiplexer that is controlled by the signal from the detector 31, for example, to select a specific input from among a plurality of inputs.

Through the process as described above, the control box 30 receives signals from each module set MS1 to MS4 through each transmission line 50. The signals from the module sets MS1 and MS4 with the sensor 10 include the signal from the sensor 10, and the flag signal is "1", and the signals from the module sets MS2 and MS3 without the sensor 10 do not include the signal from the sensor 10, and the flag signal is "0". Therefore, the detector 31 checks whether the flag signal is "1" for each transmission line 50, and accordingly, detects that the two module sets MS1 and MS4 are module sets including the signal from the sensor 10. The detector 31 outputs "0" and "1" as the signals corresponding to the module sets MS1 and MS4, and the output signals are input to the selector 32 as control signals.

The selector 32 selects a transmission line from the module sets MS1 and MS4 among the four transmission lines 50 input as "0" and "1" are input as control signals, and sets the selected transmission line as a channel for communication of the sensor 10. Accordingly, only the signals from the module sets MS1 and MS4 including the signals from the sensor 10 are selected and transmitted to the processor 33. The processor 33 receives the signal from the sensor 10 and transmits the received signal to other peripheral devices that require the received signal.

According to the disclosure as described above, when the sensor 10 is installed in the display module 20, the signal from the sensor 10 is transmitted to the control box 30 via each display module 20 along the path to which the display modules 20 are connected. Therefore, there is no need for a separate sensor signal transmission line for connecting between the sensor 10 and the control box 30.

In addition, the receiver, the transmitter, and the controller provided in the display module 20 are used while the signal is transmitted from the sensor 10. In this configuration, the operation of the controller is changed in software to transmit the signal from the sensor 10, there is no need to provide additional hardware for the existing display module 20, and perform additional operations such as re-timing of signals.

Furthermore, according to the disclosure, even when the display module 20 is rearranged, the display module 20 is additionally installed, the position of the sensor 10 is changed, or the like, the signal from the sensor is transmitted from the display module 20 provided with the current sensor 10 to the control box 30 via the display modules 20 sequentially connected without separately performing the additional operation. Therefore, there is no need for additional setting operation and the like for transmitting the signal from the sensor 10.

Furthermore, according to the disclosure, even when the sensor signal is included only some of the transmission lines 50 through which the signal is transmitted to the control box 30, some of the display modules or some of the module sets including the sensor signal are detected, so, with respect to the module set including the sensor signal, a channel for communication with the sensor may be set.

Although the exemplary embodiments of the disclosure have been illustrated and described hereinabove, the disclosure is not limited to the above-mentioned specific embodiments, but may be variously modified by those skilled in the art to which the disclosure pertains without departing from the scope and spirit of the disclosure as disclosed in the accompanying claims. These modifications should also be understood to fall within the scope of the disclosure.

What is claimed is:

1. A multi-display apparatus, comprising:
a plurality of display modules; and
one or more sensors,
wherein the plurality of display modules include a first display module, a second display module installed at a rear stage of the first display module, and a third display module installed at a front stage of the first display module,
the first display module includes a display, a first receiver, a second receiver, a first transmitter and a processor, the second display module includes a third receiver, and the third display module includes a second transmitter,
the first receiver, the second receiver and the first transmitter of the first display module, the third receiver of the second display module and the second transmitter of the third display module include a circuitry, respectively,
the first display module is configured to display an image on the display based on a first signal received from the second transmitter of the third display module through the second receiver, and
the first transmitter of the first display module is configured to transmit a signal including the first signal, a second signal and a flag signal to the third receiver of the second display module, the second signal being received by the first receiver of the first display module from a sensor of the third display module among the one or more sensors, the flag signal indicating that the second signal is included in the signal transmitted to the third receiver of the second display module, and
wherein the first receiver of the first display module is configured to transmit the received second signal to the processor of the first display module,
the second receiver of the first display module is configured to transmit the received first signal to the processor of the first display module, and
the processor of the first display module is configured to generate the flag signal and transmit the signal including the first signal, the second signal and the flag signal to the first transmitter of the first display module.

2. The multi-display apparatus of claim 1, further comprising:
a control box including a circuitry and configured to control the plurality of display modules,
wherein the plurality of display modules are constituted by a plurality of module sets each including display modules sequentially connected, and
the control box receives signals through a plurality of transmission lines connected to display modules of a final stage in each of the module sets.

3. The multi-display apparatus of claim 2, wherein the control box includes:
a detector configured to detect whether the signals from the plurality of transmission lines include the flag signal; and
a selector configured to select a transmission line detected as including the flag signal by the detector and set the selected transmission line as a channel for communication with a sensor of the one or more sensors,
wherein each of the detector and the selector includes a circuitry.

4. A display module used to configure a multi-display apparatus, comprising:
a display;
a first receiver and a second receiver;
a first transmitter; and
a processor,
wherein the first transmitter includes a circuitry,
wherein the processor is configured to:
control the display to display an image based on a first signal received from a second transmitter of a third display module installed at a front stage of the display module through the second receiver, and
control the first transmitter to transmit a signal including the first signal, a second signal and a flag signal to a third receiver of a second display module installed at a rear stage of the display module,
wherein the second signal is received by the first receiver of the display module from a sensor of the third display module, and the flag signal indicates that the second signal is included in the signal transmitted to the third receiver of the second display module, and
wherein the first receiver of the display module is configured to transmit the received second signal to the processor of the display module,
the second receiver of the display module is configured to transmit the received first signal to the processor of the display module, and
the processor of the display module is configured to generate the flag signal and transmit the signal including the first signal, the second signal and the flag signal to the first transmitter of the display module.

5. A control box for a multi-display apparatus receiving signals from a plurality of display modules through a plurality of transmission lines, the plurality of display modules including a first display module, and a second display module installed at a rear stage of the first display module, and a third display module installed at a front stage of the first display module, the first display module including a display, a first receiver, a second receiver, a first transmitter and a processor, and the second display module including a third receiver, and the third display module including a second transmitter, the control box comprising:
a detector configured to detect whether the signals from the plurality of transmission lines include a generated flag signal; and
a selector configured to select a transmission line detected as including the flag signal by the detector and set the selected transmission line as a channel for communication with a sensor,
wherein an image is displayed on the display based on a first signal received from the second transmitter of the third display module through the second receiver, and
wherein a signal including the first signal, a second signal and a flag signal is transmitted by the first transmitter of the first display module to the third receiver of the second display module,
wherein the flag signal indicates that the second signal received by the first receiver of the first display module among the plurality of display modules from a sensor of the third display module is included in the signal transmitted to the third receiver of the second display module
wherein each of the detector and the selector includes a circuitry,
wherein the received second signal is transmitted by the first receiver of the first display module to the processor of the first display module,
wherein the received first signal is transmitted by the second receiver of the first display module to the processor of the first display module, and
where the flag signal is generated by the processor of the first display module, and the signal including the first signal, the second signal and the flag signal is transmitted to the first transmitter of the first display module by the processor of the first display module.

6. A method of transmitting a sensor signal of a multi-display apparatus including a plurality of display modules sequentially connected and including a first display module, a second display module installed at a rear stage of the first display module, and a third display module installed at a front stage of the first display module, each of the plurality of display modules including one or more sensors, and each of the first display module, the second display module and the third display module including a circuitry, the first display module including a display, a first receiver, a second receiver, a first transmitter and a processor, and the second display module including a third receiver, and the third display module including a second transmitter, the method comprising:
generating, by the first display module, a flag signal;
displaying, by the first display module, an image on the display based on a first signal received from the second transmitter of the third display module through the second receiver, and
transmitting, by the first transmitter of the first display module, a signal including the first signal, the flag signal and a second signal to the third receiver of the second display module,
wherein the second signal is received by the first receiver of the first display module from a sensor of the third display module among the one or more sensors, and the flag signal indicates that the second signal is included in the signal transmitted to the third receiver of the second display module,
wherein the method further comprises:
transmitting, by the first receiver of the first display module, the received second signal to the processor of the first display module,
transmitting, by the second receiver of the first display module, the received first signal to the processor of the first display module, and
generating, by the processor of the first display module, the flag signal and transmitting, by the processor of the first display module, the signal including the first signal, the second signal and the flag signal to the first transmitter of the first display module.

7. The method of claim 6, wherein the plurality of display modules are constituted by a plurality of module sets connected to a control box and including the plurality of display modules sequentially connected, and
the control box is configured to receive signals through a plurality of transmission lines connected to display modules of a final stage in each of the module sets.

8. The method of claim 7, further comprising:
detecting, by the control box, whether the signals from the plurality of transmission lines include the flag signal; and
selecting a transmission line detected as including the flag signal and setting the selected transmission line as a channel for communication with the sensor.

* * * * *